US012798391B2

(12) United States Patent
Gunawan et al.

(10) Patent No.: US 12,798,391 B2
(45) Date of Patent: Nov. 17, 2026

(54) MAGLEV WITH DIPOLE-LINE MAGNET TRACK SYSTEM

(71) Applicant: International Business Machines Corporation, Armonk, NY (US)

(72) Inventors: Oki Gunawan, Westwood, NJ (US); Josephine Monica, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 18/466,861

(22) Filed: Sep. 14, 2023

(65) Prior Publication Data

US 2025/0092610 A1 Mar. 20, 2025

(51) Int. Cl.

*B60L 13/04* (2006.01)
*B60L 13/10* (2006.01)
*B61B 13/08* (2006.01)
*E01B 25/30* (2006.01)

(52) U.S. Cl.

CPC ............... *B60L 13/04* (2013.01); *B60L 13/10* (2013.01); *B61B 13/08* (2013.01); *E01B 25/30* (2013.01)

(58) Field of Classification Search

CPC .......... E01B 25/30; B60L 13/04; B60L 13/10; B61B 13/08
USPC ................................. 104/281, 282, 284, 286
See application file for complete search history.

(56) References Cited

U.S. PATENT DOCUMENTS 3,196,566 A 7/1965 Littlefield
3,664,268 A * 5/1972 Lucas ..................... B61B 13/08 104/286
5,182,533 A 1/1993 Ritts
5,253,591 A * 10/1993 Rote ....................... B60L 13/10 104/139
5,270,593 A 12/1993 Levi et al.
5,651,318 A 7/1997 O'Donohue
5,931,714 A 8/1999 Johnson
6,361,268 B1 3/2002 Pelrine
6,413,138 B1 7/2002 Dokoupil
7,252,001 B2 8/2007 Boletis
7,501,922 B2 3/2009 Kazadi
7,633,203 B2 12/2009 Hull et al.
7,859,157 B2 12/2010 Baur
8,074,579 B1 12/2011 Bojiuc (Continued)

FOREIGN PATENT DOCUMENTS

CN 110356243 A 10/2019
CN 113815426 A 12/2021

(Continued)

OTHER PUBLICATIONS

"Earnshaw's theorem", Wikipedia, Retrieved from "https://en.wikipedia.org/w/index.php?title=Earnshaw%27s_theorem&oldid=1157121087" Jul. 10, 2023, 6 pages.

(Continued)

*Primary Examiner* — Zachary L Kuhfuss
(74) *Attorney, Agent, or Firm* — Harrity & Harrity, LLP

(57) ABSTRACT

A maglev with a dipole-line magnet track system is provided that includes at least one dipole-line magnet track. The at least one dipole-line magnet track includes a first dipole-line magnet and a second-dipole line magnet disposed in parallel. A levitating diamagnet is disposed on the at least one dipole-line magnet track. A vehicle is connected to the levitating diamagnet.

19 Claims, 4 Drawing Sheets

(56) References Cited

U.S. PATENT DOCUMENTS

| | | | | |
|---|---|---|---|---|
| 8,895,355 | B2 | 11/2014 | Cao | |
| 9,236,293 | B2 | 1/2016 | Cao et al. | |
| 9,245,679 | B1 | 1/2016 | Termain | |
| 9,978,493 | B2 | 5/2018 | Gunawan | |
| 10,082,408 | B2 | 9/2018 | Gunawan | |
| 10,125,814 | B2 | 11/2018 | Walsh | |
| 10,308,135 | B2 | 6/2019 | Henderson | |
| 10,460,863 | B2 | 10/2019 | Gunawan | |
| 10,593,456 | B2 | 3/2020 | Gunawan | |
| 10,800,268 | B2 | 10/2020 | Gunawan | |
| 10,995,820 | B2 | 5/2021 | Sanders et al. | |
| 2007/0170798 | A1 | 7/2007 | Gohin et al. | |
| 2010/0126374 | A1 | 5/2010 | Ji | |
| 2010/0127579 | A1 | 5/2010 | Bojiuc | |
| 2014/0261055 | A1* | 9/2014 | Oster | E01B 25/30 104/138.1 |
| 2019/0217722 | A1* | 7/2019 | Gunawan | B60L 15/005 |
| 2019/0227131 | A1* | 7/2019 | Gunawan | G01B 11/14 |
| 2023/0246569 | A1 | 8/2023 | Ren | |

FOREIGN PATENT DOCUMENTS

| | | | |
|---|---|---|---|
| CN | 115284888 | A | 11/2022 |
| WO | 2013130888 | A1 | 9/2013 |

OTHER PUBLICATIONS

Bassani et al., "Passive Magnetic Bearings. Low Instability and Possible Stability", Proceedings of WTC2005, World Tribology Congress III, Sep. 12-16, 2005, Washington, D.C., USA, 2 pages.

Bassani, Roberto, "Dynamic stability of passive magnetic bearings", Springer Link, Published: Dec. 8, 2006, Nonlinear Dynamics 50, 161-168 (2007), Abstract Only 4 pages.

Berry et al., "Of flying frogs and levitrons", Eur. J. Phys. 18 (1997) 307-313. Printed in the UK, IOP Science, 8 pages.

Bjork et al., "A conical passive magnetic bearing with constant stiffness", Scientifc Reports, 2022, https://doi.org/10.1038/s41598-022-07988-6, 9 pages.

Chen et al., "A self-tuning fuzzy PID-type controller design for unbalance compensation in an active magnetic bearing", Expert Systems with Applications, vol. 36, Issue 4, May 2009, pp. 8560-8570, https://doi.org/10.1016/j.eswa.2008.10.055, Abstract Only 6 pages.

Gunawan et al., "A parallel dipole line system," Applied Physics Letters, vol. 106, No. 6, 062407, (2015), <https://doi.org/10.1063/1.4907931> Submitted: Nov. 20, 2014, Accepted: Jan. 23, 2015, Published Online: Feb. 12, 2015, 6 pages.

Gunawan et al., "The one-dimensional camelback potential in the parallel dipole line trap: Stability conditions and finite size effect," Journal of Applied Physics 121, 133902 (2017), DOI: 10.1063/1.4978876, 26 pages.

Habermann et al., "An active magnetic bearing system", Tribology International, vol. 13, Issue 2, Apr. 1980, p. 85, https://doi.org/10.1016/0301-679X(80)90021-3, Abstract Only, 3 pages.

Jayawant, B., "Electromagnetic suspension and levitation," Reports on Progress in Physics, vol. 44, 411 (1981), Printed in Great Britain, 74 pages.

Kubota, Tetsuya, "Controller Design for Precision Magnetic Bearings", Submitted to the Department of Mechanical Engineering in Partial Fulfillment of the Requirements for the degree of Master of Science at MIT, May 1977, 107 pages.

Lee et al., "Review of Maglev Train Technologies," in IEEE Transactions on Magnetics, vol. 42, No. 7, Jul. 2006, pp. 1917-1925, doi: 10.1109/TMAG.2006.875842.

Musk, E. "Hyperloop Alpha", 2013, 58 pages.

Ohji et al., "Permanent magnet bearings for horizontal- and vertical-shaft machines: A comparative study", Journal of Applied Physics, vol. 85, No. 8, Apr. 15, 1999, 4 pages.

Post et al., "The Inductrack: a simpler approach to magnetic levitation," IEEE Transactions on Applied Superconductivity, vol. 10, No. 1, Mar. 2000, pp. 901-904, doi: 10.1109/77.828377.

Rote et al., "Review of Dynamic Stability of Repulsive-Force Maglev Suspension Systems," IEEE Transactions on Magnetics, vol. 38, No. 2, Mar. 2002, pp. 1383-1390, doi: 10.1109/20.996030.

Sawada, Kazuo, "Development of magnetically levitated high speed transport system in Japan," IEEE Transactions on Magnetics, vol. 32, No. 4, Jul. 1996, pp. 2230-2235, doi: 10.1109/20.508609.

Schuhmann et al., Improving Operational Performance of Active Magnetic Bearings Using Kalman Filter and State Feedback Control, IEEE Transactions on Industrial Electronics, vol. 59, No. 2, Feb. 2012, 9 pages.

Shafai et al., "Adaptive Forced Balancing for Magnetic Bearing Control System", Proceedings of the 31st Conference on Decision and Control, Tucson, Arizona, Dec. 1992, 5 pages.

Supreeth et al., "A review of superconducting magnetic bearings and their application," IEEE Transactions on Applied Superconductivity, vol. 32, No. 3, Apr. 2022, 15 pages.

Wai et al., "Real-Time PID Control Strategy for Maglev Transportation System via Particle Swarm Optimization", IEEE Transactions on Industrial Electronics, vol. 58, No. 2, Feb. 2011, Digital Object Identifier 10.1109/TIE.2010.2046004, 18 pages.

Wang et al., "A New Electromagnetic Levitation System for Rapid Transit and High Speed Transportation," IEEE Transactions on Magnetics, vol. 30, No. 6, Nov. 1994, pp. 4734-4736, doi: 10.1109/20.334205.

Weh et al., "Magnetic Levitation With Controlled Permanentic Excitation," IEEE Transactions on Magnetics vol. MAG-13, No. 5, Sep. 1977, pp. 1409-1411, doi: 10.1109/TMAG.1977.1059567.

Yanliang et al., "Analysis of Hybrid Magnetic Bearing With a Permanent Magnet in the Rotor by FEM", IEEE Transactions on Magnetics, vol. 42, No. 4, Apr. 2006, 4 pages.

Yonnet, Jean-Paul, "Permanent Magnet Bearings and Couplings", IEEE Transactions on Magnetics, vol. MAG-17, No. 1, Jan. 1981, 5 pages.

Zhilichev, Y., "Analysis of a Magnetic Bearing Pair with a Permanent Magnet Excitation", IEEE Transactions on Magnetics, vol. 36, No. 5, Sep. 2000, 3 pages.

List of IBM Patents or Patent Applications Treated as Related. Filed Sep. 14, 2023. 2 pages.

Gunawan et al., "Passive Magnetic Bearing Using Diamagnetic Levitation", U.S. Appl. No. 18/466,860, filed Sep. 14, 2023.

* cited by examiner

MAGLEV WITH DIPOLE-LINE MAGNET TRACK SYSTEM

BACKGROUND

Exemplary embodiments of the present invention relate to a magnetic levitation vehicle (maglev), and more particularly, to a maglev with a dipole-line magnet track system.

Urban areas increasingly require faster, cleaner, and more efficient transportation for growing populations. Maglev trains represent a compromise in speed between conventional locomotive trains and airplanes (which are too costly and impractical for routine use). Maglev trains offer advantages to traditional forms of transportation, such as frictionless levitation, enhanced speed, enhanced safety, and reduced air and noise pollution. A maglev train system has three main components (1) levitation, (2) guidance, and (3) propulsion. Unfortunately, there are several issues in the existing maglev trains that prevent widespread adoption, primarily concerning their methods of levitation. Current magnetic levitation technology can be mainly categorized into electromagnetic suspension (EMS) and electrodynamic suspension (EDS).

EMS suspends trains using upward force from electromagnetic attractions. However, Earnshaw's theorem provides that a magnetized body cannot rest in stable equilibrium under magnetostatic fields, thus EMS is inherently unstable. Therefore, an EMS system is typically equipped with a feedback system that adjusts the electromagnet current to correct the object's motion and mitigate instability. In addition, EMS also requires a large current, hence a large power input, to produce a strong magnetic field capable of suspending loads (e.g., a maglev). Thus, some systems propose hybrid EMS which combine permanent magnets for levitation in conjunction with electromagnet feedback to stabilize the levitation. The magnetic force from the permanent magnets can offset the field requirement of EMS and reduce the power consumption from the electromagnet. However, it requires much more current amplitude variation than standard EMS because the passive magnet has a greater relative permeability of air.

Different from EMS, EDS relies on Faraday's law of induction: conductors exposed to a time-varying magnetic field induce Eddy current that creates a repulsive magnetic field which produces levitation force. This is typically realized using a stationary conducting track and a superconducting or permanent magnet that move together with the train. For instance, the inductrack employs a Halbach array of permanent magnets attached under the train and a track embedded with closely packed coils. The Hyperloop system also uses a Halbach array, but with a conductor material as its track. Some EDS systems, such as JR-trains, use superconducting magnets. Some benefits of EDS over EMS include reduced power consumption and dynamic stability. EDS systems achieve lower power consumption compared to EMS systems, even with the cryogenic cooling system for superconducting magnets. Most importantly, unlike EMS, EDS is naturally stable, and the magnetic field acts like a compressed spring. However, since levitation occurs purely through movement, EDS does not levitate at low speed and requires a special mechanism, such as wheels and linear motors for low-speed operation/stages. Moreover, the entire track must be able to support both low and high-speed operations in case of a power failure.

SUMMARY

According to an embodiment of the present invention, a maglev with a dipole-line magnet track system is provided that includes at least one dipole-line magnet track. The at least one dipole-line magnet track includes a first dipole-line magnet and a second-dipole line magnet disposed in parallel. A levitating diamagnet is disposed on the at least one dipole-line magnet track. A vehicle is connected to the levitating diamagnet.

According to an embodiment of the present invention, a maglev with a dipole-line magnet track system is provided that includes a plurality of parallel dipole-line magnet tracks that extend in a substantially linear direction. Each of the plurality of parallel dipole-line magnet tracks include a first dipole-line magnet and a second-dipole line magnet. A diamagnetic rod is disposed on each of the plurality of parallel dipole-line magnet tracks. A train with protrusions is connected to the diamagnetic rods.

According to an exemplary embodiment of the present invention, a maglev with a dipole-line magnet track system is provided that includes a plurality of parallel dipole-line magnet tracks that extend in a substantially linear direction. Each of the plurality of parallel dipole-line magnet tracks include a first dipole-line magnet and a second-dipole line magnet. A super conductor rod that includes diamagnetic materials is disposed on each of the plurality of parallel dipole-line magnet tracks with a complimentary shape thereto. A train with a plurality of protrusions extending from a lower surface is connected to the super conductor rods. A plurality of propulsion wire racks is disposed at the lower surface of the train. The plurality of propulsion wire racks each have a serpentine coil shape and magnetic shielding at alternate vertical segments of the serpentine coil shape. The plurality of propulsion wire racks propels the vehicle when current is applied.

BRIEF DESCRIPTION OF THE DRAWINGS

The following detailed description, given by way of example and not intended to limit the exemplary embodiments solely thereto, will best be appreciated in conjunction with the accompanying drawings, in which.

Figure 1A:
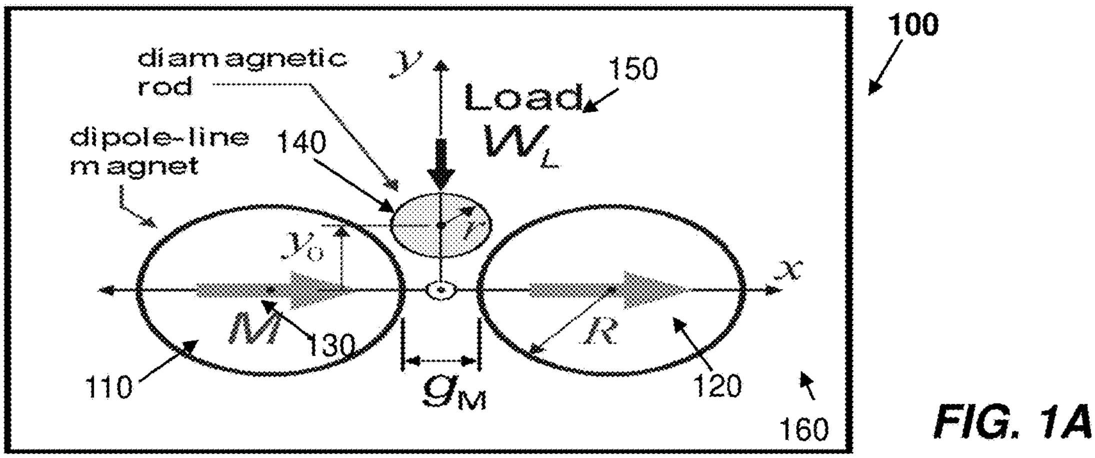
FIGS. 1A, 1B, 1C and 1D each illustrate a different cross-sectional shape of a passive magnetic bearing using diamagnetic levitation 100, in accordance with exemplary embodiments of the present invention.
Figure 1B:
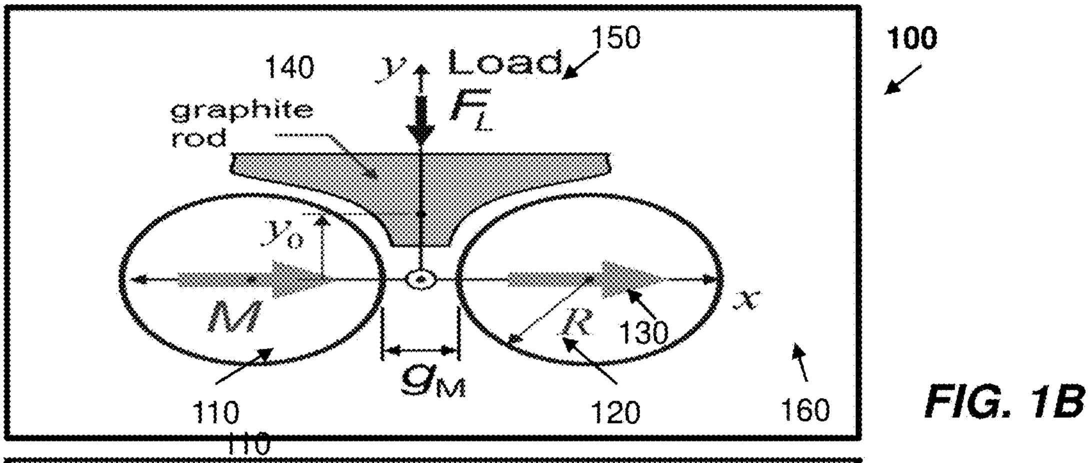
Figure 1C:
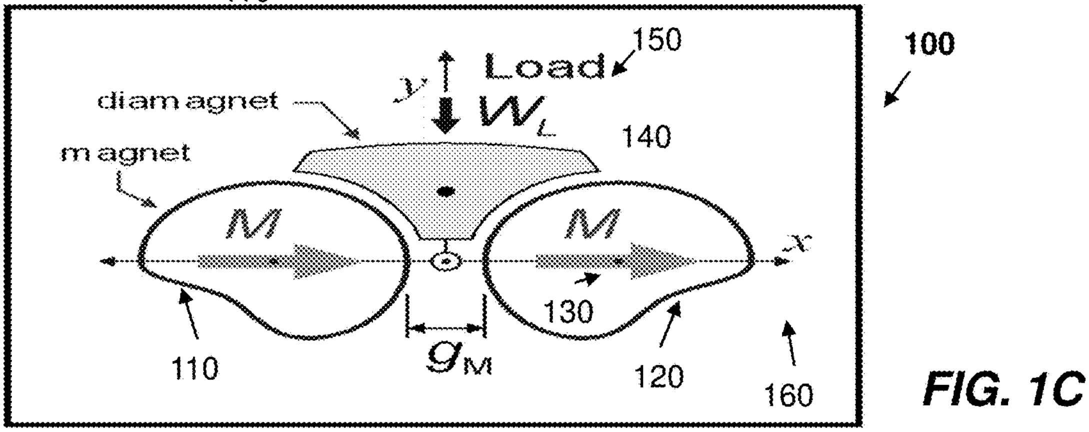

It is to be understood that the included drawings are not necessarily drawn to scale/proportion. The included drawings are merely schematic examples to assist in understanding of the present invention and are not intended to portray fixed parameters. In the drawings, like numbering may represent like elements.

DETAILED DESCRIPTION

Exemplary embodiments of the present invention are disclosed hereafter. However, it shall be understood that the scope of the present invention is dictated by the claims. The disclosed exemplary embodiments are merely illustrative of the claimed maglev with a dipole-line magnet track system. The present invention may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present invention, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present invention according to various exemplary embodiments.

As aforementioned, Electro-Magnet Suspension (EMS) Maglev use electromagnetic suspension (i.e., attractive force between electromagnets and ferromagnets with negative feedback for levitation and guidance). The EMS Maglev can levitate at any speed; creates minimal noise; and is safe, reliable, and efficient to maintain. However, EMS Maglev have limited speed due to narrow gap; consume tremendous energy to levitate; are very costly to operate; and require complex negative feedback systems and precise gap control. ElectroDynamic Suspension (EDS) Maglev use electrodynamic suspension (i.e., attractive and repulsive forces between superconductor magnets and metal loops on the side rails. EDS Maglev can achieve record speeds (600 km/h); create minimal noise; and are safe, reliable, and efficient to maintain. However, EDS Maglev are unable to levitate at low speed, require low speed wheels mechanism, require cryogenic liquids (He and $N_2$) for superconductors, and are very costly.

The present invention provides for a maglev system based on diamagnetic suspension and a dipole-line magnet track system. The maglev system consists of a set of dipole-line magnetic tracks and diamagnetic rods that provide vehicle suspension and guidance simultaneously. For maglev propulsion, a special coil arrangement can be used in the form of a serpentine-style wire rack with magnetic shields at alternating segments. The wire rack can be placed in between the dipole-line magnets at the center and driven by an electric current to produce a net propulsion force both for accelerating and decelerating motion. The maglev system serves as a novel and improved magnetic levitation vehicle that overcome several shortcomings in the existing maglev systems. EMS and EDS Maglev have downsides, such as complex feedback systems to maintain a narrow gap, inability to levitate at zero speeds, need of cryogenic liquids, and very high costs of operation. The present invention solves some of the issues of both the EMS and EDS Maglev concerning levitation, for example by enabling zero energy input, perpetual levitation while preserving safe operation at all speeds.

FIGS. 1A, 1B, 1C and 1D each illustrate a different cross-sectional shape of a passive magnetic bearing using diamagnetic levitation 100, in accordance with exemplary embodiments of the present invention.

Figure 3:
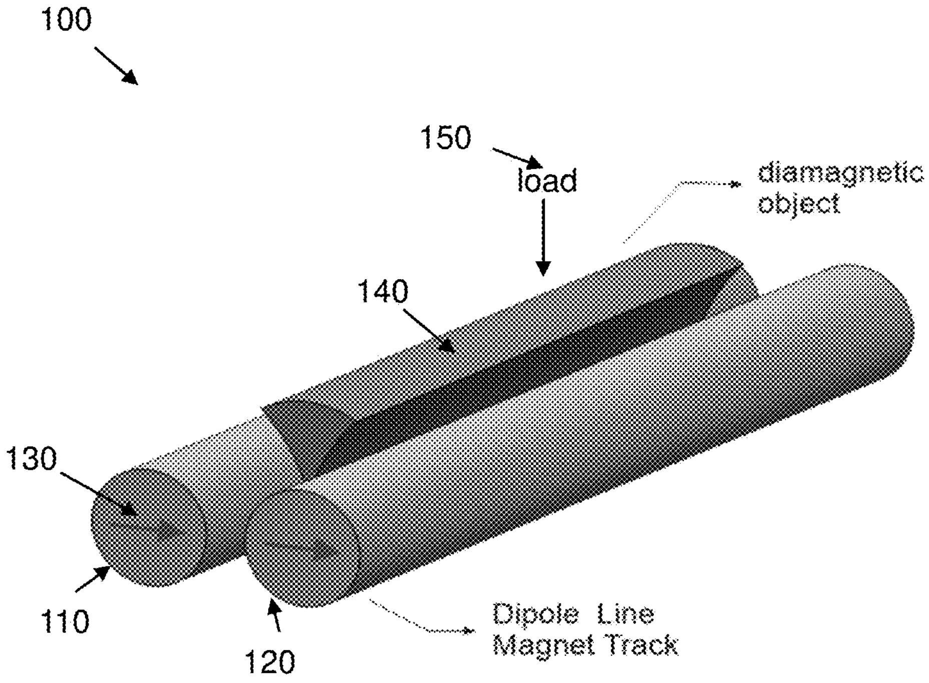
FIG. 3 illustrates a perspective view of the passive magnetic bearing using diamagnetic levitation 100 included in a linear track, in accordance with an exemplary embodiment of the present invention.

The passive magnetic bearing using diamagnetic levitation 100 can include a plurality of dipole magnets (e.g., dipole-line magnets) disposed in parallel. The plurality of dipole magnets can include a first dipole-line magnet 110 and a second dipole-line magnet 120. The first dipole-line magnet 110 and the second dipole-line magnet 120 can represent a pair. The plurality of dipole-line magnets will produce very strong magnetic field 130 in between the dipole-line magnets 110/120. At least some of the magnetic fields 130 can have a substantially same x direction (e.g., a lateral direction) of magnetization. The plurality of dipole-line magnets 110/120 can have various cross-section shapes which can extend in a substantially lengthwise direction (e.g., as a linear track as depicted in FIG. 3). For example, the plurality of dipole-line magnets 110/120 can have a substantially round (e.g., oval, ellipse, irregular circle, etc.) cross-section shape, as illustrated in FIGS. 1A-1D. Dipole-line magnets 110/120 can include a radius R and magnetization M.

A levitating diamagnet 140 (e.g., a graphite object/rod, superconductor object/rod, etc.) can be at least partially disposed on surfaces of the plurality of dipole-line magnets 110/120 (e.g., the pairs/linear track). The levitating diamagnet 140 can also have various cross-section shapes, such as a circle (illustrated in FIG. 1A) or a shape with a lower surface that corresponds to the shape of the upper and/or inner surfaces of the dipole-line magnet pair on which it is disposed (illustrated in FIGS. 1B-1D). The levitating diamagnet 140 can extend in a substantially lengthwise direction (e.g., along the linear track as depicted in FIG. 3). The levitating diamagnet 140 can be suspended in a substantially perpendicular direction relative to the direction of the magnetic field(s) 130. A load 150 can be disposed on the levitating diamagnet 140. A levitating diamagnet (also referred to herein as a diamagnetic rod, a diamagnetic object, or a diamagnet) 140 of cylindrical shape has a mass density $\rho$ and magnetic susceptibility $\chi$ and radius r.

The passive magnetic bearing using diamagnetic levitation 100 can be disposed in a vacuum chamber 160.

The system can also be optimized to include a predetermined cross-section for at least one of the dipole-line magnets 110/120 and the levitating diamagnet 140 to maximize the LBC further and/or to reduce material cost.

Figure 1D:
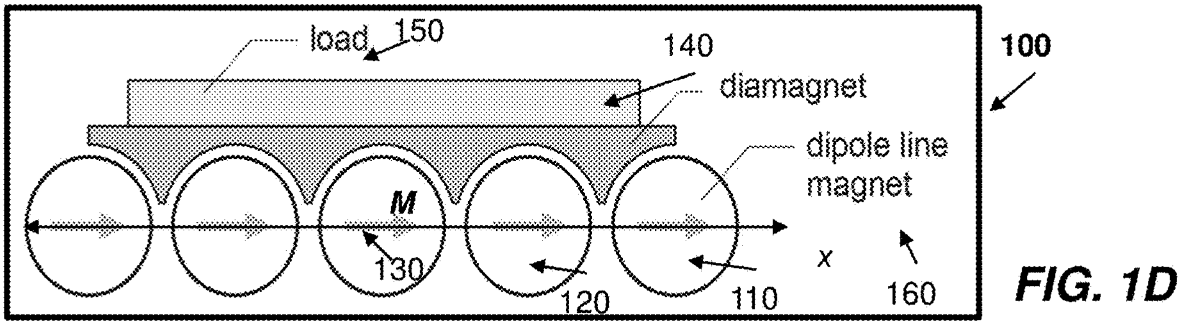

According to an exemplary embodiment, as depicted in FIG. 1D, the quantity of dipole-line magnets 110/120 (e.g., pairs) can be increased in proportion to a desired load bearing capacity (LBC) and/or load 150 size and the corresponding levitating diamagnets 140 can be connected accordingly (e.g., integrated in a cross-sectional view).

To achieve the highest LBC we have recognized that the diamagnetic levitation force FDM depends on several factors in this system given as [see M. V. Berry & A. K. Geim, "Of flying frogs & levitrons", European J. Physics 18, 307 (1997)].

$$F_{DM} = \frac{\chi}{\mu_0} B \frac{dB}{dy} V \tag{1}$$

The diamagnetic repulsion force depends on the diamagnet's magnetic susceptibility $\chi$, magnetic field B at the levitating diamagnet 140, magnetic field gradient dB/dy along the vertical direction y and the volume of the diamagnet V. The constant $\mu_0$ is the magnetic permeability in vacuum.

This magnetic levitation system has two sets of parameters: (1) Fixed parameters associated with the given materials of the magnets and diamagnet: magnet's magnetization M, the diamagnet mass density p and magnetic susceptibility $\chi$. (2) Free parameters associated with the dimension of the system, such as the magnet radius R, magnet gap $g_M$ and the diamagnet radius r.

To maximize the LBC we can optimize only the free parameters and there is at least a set of values that will maximize the LBC. For example, if the radius R is too small, then the size of the supported levitating diamagnet 140 is correspondingly small, and thus will yield a small LBC. If R is too large the levitation will fail, no matter what is the diamagnet radius. Therefore, there is an intermediate optimum value of R that yield maximum LBC.

For a given magnet radius R, if the diamagnet radius r is too small it will yield a very small LBC, but if r is too large it will fail to levitate and will rest on the surface of the dipole-line magnets 110/120. Thus similarly, there is an optimum value for the diamagnet radius r.

For a given magnet radius R, if the magnet gap $g_M$ is too small, there is very little space in between the magnets which limits the size of the diamagnet resulting in very small LBC. However, if the gap is too large the diamagnet will fail to levitate. In fact, there is a critical gap $g_C$ beyond which the levitation will not occur, given as:

$$g_C = 2R\left(\sqrt[5]{\frac{-2.069\chi\,\mu_0 M^2}{(2+\chi)\rho\, gR}} - 1\right) \tag{2}$$

In general, for the PDL system the LBC will mainly depend on the radius of the magnet R. This LBC is given approximately as:

$$\lambda(R) = \frac{\pi}{16}\rho R^2\left[-c_0\frac{\chi}{2+\chi}\frac{\mu_0 M^2}{\rho\, gR} - 1\right] \tag{3}$$

where $c_0$ is a constant given as $$c_0 = \frac{2^{10}}{5^6}\sqrt{90 + 42\sqrt{21/5}} = 0.870$$

and g is the gravitational acceleration. This optimum LBC requires a corresponding set of optimum parameters that includes diamagnet radius r and magnet gap $g_M$. They are given approximately as:

$$r = R/4 \text{ and } g_M = c_1 R \tag{4}$$

with $c_1$ is a constant given as:

$$c_1 = \sqrt{\frac{5}{32}\left(25 + \sqrt{105}\right)} - 2 = 0.346.$$

Please note that these diamagnet radius r and magnet gap $g_M$ mainly depend on the magnet radius R.

Figure 2:
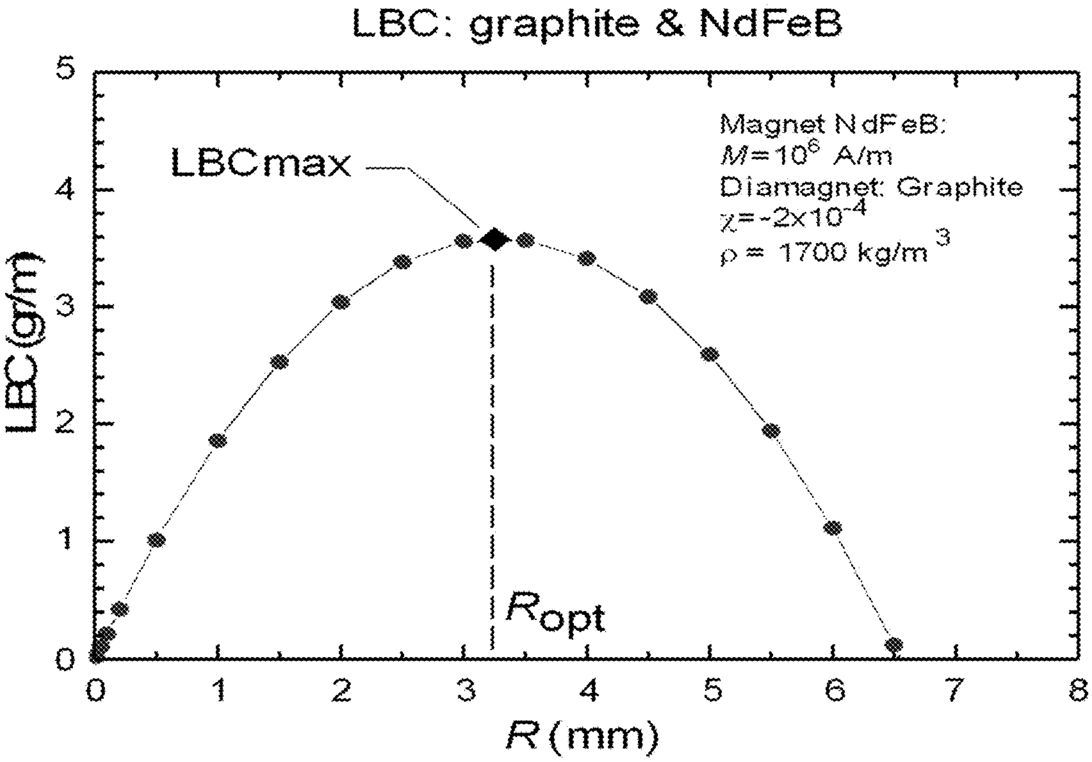
FIG. 2 illustrates a graph of load-bearing capacity (LBC) versus radius (R) for the passive magnetic bearing using diamagnetic levitation 100 depicted in FIG. 1A.

FIG. 2 illustrates a graph of load-bearing capacity (LBC) versus radius (R) for the passive magnetic bearing using diamagnetic levitation 100 depicted in FIG. 1A. FIG. 2 shows the graph of Eq. (3): the LBC vs. magnet radius R. The magnet is a NdFeB type and the diamagnet is graphite as an example. We observe that the LBC initially increases with radius, reaches a peak value $\lambda_{max}$ at $R_{opt}$ and then finally drops. Their values are given as:

$$R_{opt} = \frac{c_0}{2}\frac{\mu_0 M^2}{\rho g}\left(\frac{-\chi}{2+\chi}\right) \tag{5}$$

$$\lambda_{max} = \frac{c_0^2\pi}{64}\frac{\mu_0^2 M^4}{\rho g^2}\left(\frac{\chi}{2+\chi}\right)^2 \tag{6}$$

These formulas are very useful to estimate the maximum possible LBC for a given magnet and diamagnet materials. For example, for an NdFeB magnet and graphite diamagnet system we have: $R_{opt}$=3.3 mm, $\lambda_{max}$=3.58 gr/m, and the corresponding parameters of optimum diamagnet radius r=0.82 mm and optimum PDL gap: $g_M$=1.13 mm.

In a typical maglev bearing application we have a required LBC that will dictate the radius of the magnet R. For this purpose, we can solve for R in Eq. (3) which is given as:

$$R = \frac{\beta}{2}\left(1 \pm \sqrt{1 - \frac{64\lambda}{\pi\rho\beta^2}}\right) \tag{7}$$

where $\beta$ is a factor given as:

$$\beta = -c_0\frac{\chi}{2+\chi}\frac{\mu_0 M^2}{\rho g}.$$

Please note that since the magnetic susceptibility $\chi$ is a negative number, $\beta$ is a positive number. For the levitating diamagnet 140 radius and the magnet gap that yield this optimum LBC we have exactly: r=R/4 and $g_M$=$c_1$R.

An example of a calculation of the LBC for graphite and superconductor bismuth strontium calcium copper oxide (BSCCO, which can be superconducting with liquid nitrogen) is given below:

TABLE 1

LBC calculation for graphite and BSCCO superconductor. Row #3 demonstrates a smaller dimension maglev vehicle system that yields an LBC of 2000 kg/m.

| | | Diamagnetic Object | | | | Dipole Line Magnet | | | |
|---|---|---|---|---|---|---|---|---|---|
| No. | Material | Mass density ρ (kg/m$^3$) | Magnetic susceptibility χ | Radius optimum r (m) | Levitation height at LBC $y_0$ (m) | Magnetization M (A/m) | Radius optimum R (m) | Magnet gap optimum $g_M$ (m) | LBC λ (kg/m) |
| 1. | Graphite | 1700 | $-2 \times 10^{-4}$ | $8.2 \times 10^{-4}$ | $2.26 \times 10^{-3}$ | $10^6$ | $3.3 \times 10^{-3}$ | $1.13 \times 10^{-3}$ | $3.58 \times 10^{-3}$ |
| 2. | BSCCOSC | 6400 | −1 | 2.18 | 7.57 | $10^6$ | 8.7 | 3.02 | $9.52 \times 10^4$ |
| 3. | BSCCOSC* | 6400 | −1 | $2.3 \times 10^{-2}$ | $4.0 \times 10^{-2}$ | $10^6$ | $9.2 \times 10^{-2}$ | $3.2 \times 10^{-2}$ | $2 \times 10^3$ |

From Table 1 we see that for graphite and a typical NdFeB magnet we can obtain a maximum LBC of 3.58 gr/m, but by using BSCCO superconductor we can obtain a very large LBC up to 95,200 kg/m which demonstrates the immense power of superconductor levitation, albeit that requires a very large magnet (R=8.7 m).

The LBC for most practical applications is much smaller than this. For example, for a typical maglev train application where the needed LBC is approximately 2000 kg/m (row #3 Table 1), we can achieve this using NdFeB magnet and BSCCO superconductor with magnet radius R=9.2 cm and diamagnet rod radius of r=2.3 cm, which is very practical to realize. Such LBC is more than enough to suspend a typical maglev train car of 20 m long that carries 50 people with a total mass of approximately of 25,000 kg. A maglev that sits on two PDL tracks has a total LBC of 2000 kg/m×2× 20m=80,000 kg. This LBC is more than sufficient to suspend the 25,000 kg total vehicle load.

FIG. 3 illustrates a perspective view of the passive magnetic bearing using diamagnetic levitation 100 included in a linear track, in accordance with an exemplary embodiment of the present invention.

Figure 4A:
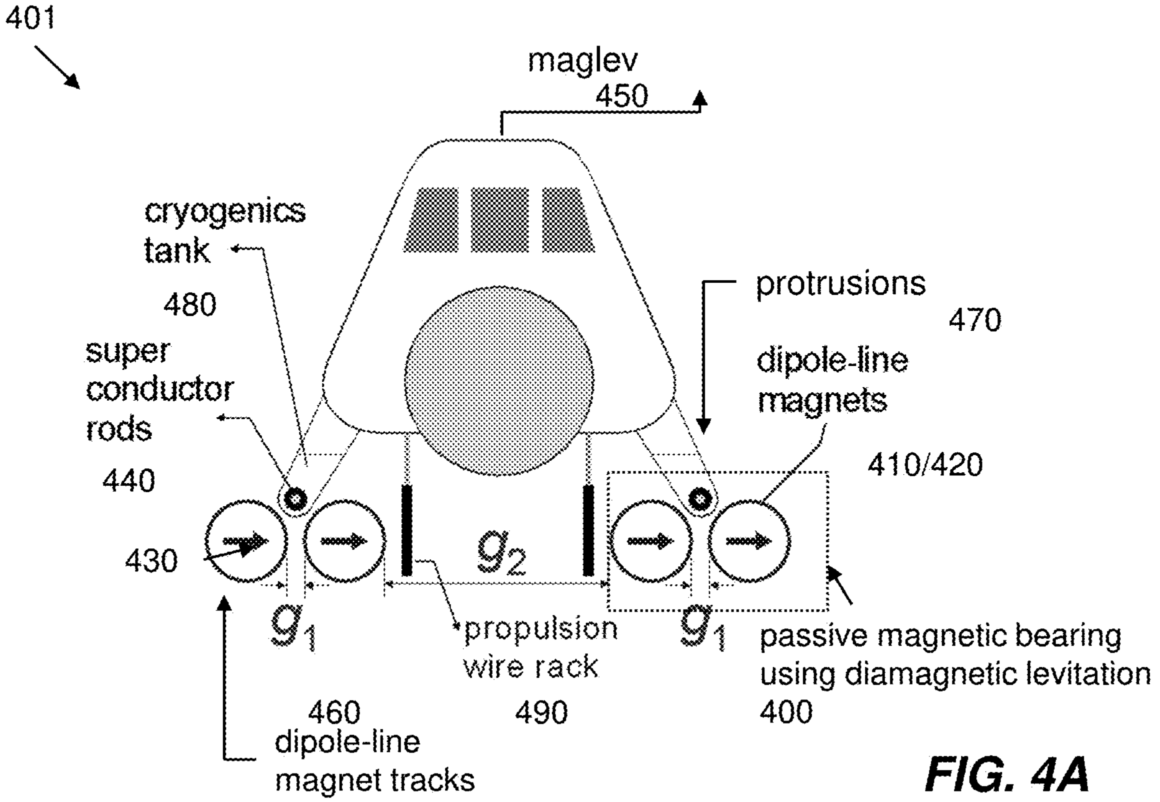
FIG. 4A illustrates a maglev with a dipole-line magnet track system 401 that includes the passive magnetic bearing using diamagnetic levitation 100, in accordance with an exemplary embodiment of the present invention.

FIG. 4A illustrates a maglev with a dipole-line magnet track system 400 that includes the passive magnetic bearing using diamagnetic levitation 400, in accordance with an exemplary embodiment of the present invention.

Figure 4B:
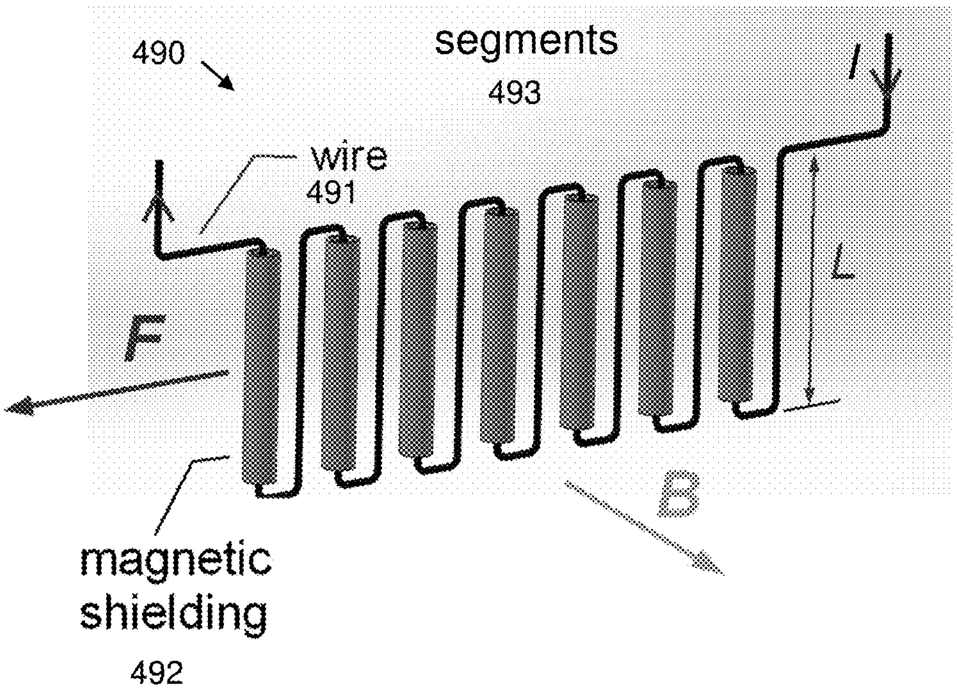
FIG. 4B illustrates a wire rack used in the maglev with a dipole-line magnet track 401 system for maglev propulsion, in accordance with an exemplary embodiment of the present invention.

FIG. 4B illustrates a wire rack used in the maglev with a dipole-line magnet track system 401 for maglev propulsion, in accordance with an exemplary embodiment of the present invention.

The maglev with a dipole-line magnet track system 401 can include at least one dipole-line magnet track 460 that includes a passive magnetic bearing using diamagnetic levitation 400 (similar to the passive magnetic bearing using diamagnetic levitation 100). The passive magnetic bearing using diamagnetic levitation 400 can include dipole-line magnets 410 and 420 that extend in a lengthwise direction (e.g., as illustrated in FIG. 3), and which can have various cross-sectional shapes (e.g., as illustrated in FIGS. 1A-1D). For example, the dipole-line magnets 410/420 can be cylindrical rods with a transverse (i.e., horizontal) magnetization direction 430. The maglev with a dipole-line magnet track system 401 can include a plurality of dipole-line magnet tracks 460, such as a parallel pair/set of dipole-line magnet tracks 460. The load 450 can be a vehicle, such as a maglev (e.g., train). The maglev 450 can be connected to at least one protrusion 470. The protrusion 470 can be connected to a cryogenic tank 480 containing a cryogenic liquid (e.g., liquid nitrogen), such as at a terminal end, that is further connected to (e.g., at least partially surrounds) diamagnetic rods (e.g., superconductor (SC) rods) 440. The protrusion 470 can extend, for example, diagonally from an outer surface (e.g., bottom) of the maglev 450. The protrusion 470 terminal end can taper and can have a lower surface that corresponds to a disposed surface of the dipole-line magnets 410/420. The maglev 450 can be suspended by the protrusions terminal end (connected to the SC rods 440) which can be at least partially disposed between a gap formed by the dipole-line magnets 410 and 420. At least one propulsion wire rack 490 can be disposed and/or connected to an outer surface (e.g., bottom) of the maglev 450. For example, the propulsion wire rack 490 can be disposed between dipole-line magnet tracks 460.

With reference to FIG. 4B, the propulsion wire rack 490 can include a wire 491, magnetic shielding 492 at alternating segments (e.g., vertical portions) of the plurality of segments 493.

To achieve propulsion, we can use a propulsion wire rack 490 as shown above. The propulsion wire rack 490 can include an assembly of a wire 491 in a serpentine configuration with segments 493 that run up and down. The magnetic field can penetrate horizontally across the propulsion wire rack 490. The segments 493 that run up and down will cancel the Lorentz force acting on the propulsion wire rack 493. Therefore, to achieve a net propulsion force F, we enclose the segments 493 with magnetic shielding 492 at alternating segments, as shown. The magnetic shielding 492 can include a high magnetic permeability metal (e.g., mu metal) or a superconductor.

To propel the maglev, we pass the current I to the propulsion wire rack 490. The net propulsion force F is given as:

$$F_{PROP} = F_0(1 - \alpha) \tag{5}$$

$$\alpha = \frac{4(d/2 + t)^2}{(d/2 + t)^2 - (d/2)^2}$$

$$F_0 = \frac{\mu_0 m_L I L}{\pi}\left[\frac{1}{(3R + g_1 + g_2)^2 + L^2/4} + \frac{1}{(R + g_2)^2 + L^2/4}\right] \tag{3}$$

where α is the shielding factor, i.e., the reduction amount of the magnetic field inside the shield. L is the height of vertical segment of the propulsion wire rack 490, R is the radius of the dipole-line magnets 410/420, $g_1$ and $g_2$ are the gap between the dipole-line magnets 410/420, and t is the thickness of the magnetic shielding 492 metal and d is the diameter of the magnetic shielding 492. The same propulsion mechanism can also be used for braking by reversing the current I flow to the rack.

Based on the foregoing, a maglev vehicle with a dipole-line magnet track system has been disclosed. However, numerous modifications, additions, and substitutions can be made without deviating from the scope of the exemplary embodiments of the present invention. Therefore, the exemplary embodiments of the present invention have been disclosed by way of example and not by limitation.

What is claimed is:

1. A maglev with a dipole-line magnet track system, comprising:

at least one dipole-line magnet track, wherein the at least one dipole-line magnet track includes a first dipole-line magnet and a second dipole-line magnet disposed in parallel;

a levitating diamagnet disposed on the at least one dipole-line magnet track;

a vehicle connected to the levitating diamagnet; and a propulsion wire rack connected to the vehicle, wherein the propulsion wire rack comprises alternate segments of magnetic shielding.

2. The maglev with a dipole-line magnet track system of claim 1, wherein the propulsion wire rack has a serpentine coil shape.

3. The maglev with a dipole-line magnet track system of claim 2, wherein the alternate segments extend in a vertical direction.

4. The maglev with a dipole-line magnet track system of claim 1, wherein the propulsion wire rack propels the vehicle in a direction responsive to being energized with current.

5. The maglev with a dipole-line magnet track system of claim 1, wherein the levitating diamagnet is a superconductor rod.

6. The maglev with a dipole-line magnet track system of claim 5, wherein the superconductor rod is at least partially disposed between the first dipole-line magnet and the second dipole-line magnet.

7. The maglev with a dipole-line magnet track system of claim 5, wherein a lower surface of the superconductor rod has a complimentary shape to disposed surfaces of the at least one dipole-line magnet track in a cross-sectional view.

8. The maglev with a dipole-line magnet track system of claim 5, wherein the superconductor rod is substantially cylindrical.

9. The maglev with a dipole-line magnet track system of claim 1, wherein at least one of the first dipole-line magnet and the second dipole-line magnet has a substantially round shape in a cross-sectional view.

10. The maglev with a dipole-line magnet track system of claim 1, further comprising:

a cryogenic tank connected to the levitating diamagnet.

11. The maglev with a dipole-line magnet track system of claim 10, wherein the cryogenic tank at least partially surrounds the levitating diamagnet.

12. The maglev with a dipole-line magnet track system of claim 10, wherein the cryogenic tank is further connected to the vehicle.

13. The maglev with a dipole-line magnet track system of claim 10, wherein the cryogenic tank contains at least one cryogenics liquid.

14. The maglev with a dipole-line magnet track system of claim 1, wherein the at least one dipole-line magnet track has a horizontal magnetic field direction.

15. The maglev with a dipole-line magnet track system of claim 1, wherein the levitating diamagnet comprises bismuth strontium calcium copper oxide (BSSCO).

16. A maglev with a dipole-line magnet track system, comprising:

a plurality of parallel dipole-line magnet tracks that extend in a substantially linear direction, wherein:

the plurality of parallel dipole-line magnet tracks comprises a first parallel dipole- line magnet track and a second parallel dipole-line magnet track; and each of the plurality of parallel dipole-line magnet tracks includes a first dipole-line magnet and a second dipole-line magnet;

a diamagnetic rod disposed on each of the plurality of parallel dipole-line magnet tracks;

a train with protrusions connected to each diamagnetic rod; and a propulsion wire rack connected to the train, wherein the propulsion wire rack is positioned between the first parallel dipole-line magnet track and the second parallel dipole-line magnet track.

17. A maglev with a dipole-line magnet track system, comprising:

a plurality of parallel dipole-line magnet tracks that extend in a substantially linear direction, wherein each of the plurality of parallel dipole-line magnet tracks includes a first dipole-line magnet and a second-dipole line magnet;

a superconductor rod that includes diamagnetic materials disposed on each of the plurality of parallel dipole-line magnet tracks with a complimentary shape thereto;

a train with a plurality of protrusions extending from a lower surface, wherein the plurality of protrusions is connected to the superconductor rod; and a plurality of propulsion wire racks disposed at the lower surface of the train, wherein the plurality of propulsion wire racks has a serpentine coil shape and magnetic shielding at alternate vertical segments of the serpentine coil shape, wherein the plurality of propulsion wire racks propel the train when current is applied.

18. The maglev with a dipole-line magnet track system of claim 17, further comprising:

a cryogenic tank connected to each of the plurality of protrusions, wherein the cryogenic tank at least partially surrounds the superconductor rod.

19. The maglev with a dipole-line magnet track system of claim 17, wherein the plurality of protrusions extend in a substantially diagonal direction.

* * * * *